(12) United States Patent
Ostanevich et al.

(10) Patent No.: US 6,718,541 B2
(45) Date of Patent: Apr. 6, 2004

(54) REGISTER ECONOMY HEURISTIC FOR A CYCLE DRIVEN MULTIPLE ISSUE INSTRUCTION SCHEDULER

(75) Inventors: Alexander Y. Ostanevich, Moscow (RU); Vladimir Y. Volkonsky, Moscow (RU)

(73) Assignee: Elbrus International Limited, Grand Cayman (KY)

(*) Notice: Subject to any disclaimer, the term of this patent is extended or adjusted under 35 U.S.C. 154(b) by 312 days.

(21) Appl. No.: 09/746,138

(22) Filed: Dec. 21, 2000

(65) Prior Publication Data

US 2002/0013937 A1 Jan. 31, 2002

Related U.S. Application Data

(63) Continuation of application No. 09/506,408, filed on Feb. 17, 2000, now abandoned
(60) Provisional application No. 60/120,353, filed on Feb. 17, 1999, provisional application No. 60/120,357, filed on Feb. 17, 1999, provisional application No. 60/120,375, filed on Feb. 17, 1999, provisional application No. 60/120,448, filed on Feb. 17, 1999, provisional application No. 60/120,527, filed on Feb. 17, 1999, and provisional application No. 60/120,649, filed on Feb. 17, 1999.

(51) Int. Cl.[7] .................................................. G06F 9/45
(52) U.S. Cl. ................. 717/149; 717/151; 717/152; 717/155; 717/156; 717/161
(58) Field of Search ................................. 717/149, 151, 717/152, 155, 156, 161

(56) References Cited

U.S. PATENT DOCUMENTS

| | | | | |
|---|---|---|---|---|
| 5,202,975 A | * | 4/1993 | Rasbold et al. | 717/151 |
| 5,202,993 A | * | 4/1993 | Tarsy et al. | 717/152 |
| 5,317,734 A | * | 5/1994 | Gupta | 717/161 |
| 5,819,088 A | * | 10/1998 | Reinders | 717/149 |
| 5,987,259 A | * | 11/1999 | Goebel | 717/152 |
| 6,526,573 B1 | * | 2/2003 | Babaian et al. | 717/161 |

OTHER PUBLICATIONS

Dani, Amod K., Ramanan, V. Janaki Govindarajan, R., "Register–Sensitive Software Pipelining", http://pdps.eece-.unm.edu/1998/papers/293.pdf. retrieved using www-.google.com, Nov. 6, 2002.*

Gibbons, Phillip B., Muchnick, Steven S., "Efficient Instruction Scheduling for a Pipelined Architecture", Hewlett–Packard Laboratories, Palo Alto, CA, 1986 ACM Portal, Nov. 7, 2002.*

Goodman, James R., Univ of Wisconsin–Madison CS Dept, Hsu, Wei–Chung, Cray Research Inc., "Code Scheduling and Register Allocation in Large Basic Blocks", 1988 ACM, retrieved from ACM Portal, Nov. 7, 2002.*

(List continued on next page.)

*Primary Examiner*—Gregory Morse
*Assistant Examiner*—Mary Steelman
(74) *Attorney, Agent, or Firm*—Townsend and Townsend and Crew LLP (57) ABSTRACT

A method for scheduling operations utilized by an optimizing compiler to reduce register pressure on a target hardware platform assigns register economy priority (REP) values to each operation in a basic block. For each time slot, operations are scheduled in order of their lowest REP values.

6 Claims, 6 Drawing Sheets

Register Economy priority

OTHER PUBLICATIONS

Rau, B. R., Glaeser, C. D., Advanced Processor Technology Group, ESL, Inc., "Some Scheduling Techniques and an Easily Schedulable Architecture for High Performance Scientific Computing", 1981 IEEE, retrieved from IEEE database, Nov. 7, 2002.*

Rau, B. Ramakrishna, Glaeser, Christopher D., Picard, Raymond L., Advanced Processor Technology Laboratory, ESL, Inc., "Efficient Code Generation for Horizontal Architectures: Compiler Techniques and Architectural Support", 1982 IEEE, retrieved Nov. 7, 2002.*

Shieh, Jong–Jiann and Papachristou, Christos A., Dept of Computer Engineering and Science, Case Western Reserve Univ., "On Reordering Instruction Streams for Pipelined Computers", 1990 ACM, retrieved from ACM Portal database, Nov. 7, 2002.*

"Some Experiments in Local Microcode Compaction for Horizontal Machines," Davidson et al., *IEEE Transactions on Computers,* vol. C–30, No. 7, Jul. 1981.

"Local Microcode Compaction Techniques," Landskov et al., *Computing Surveys,* vol. 12, No. 3, Sep. 1980.

* cited by examiner

Register Expensive Schedule (PRIOR ART)

Register Economy Schedule

FIG. 1. Register Economy vs Latest Time

FIG. 2a. Earliest Start Time (PRIOR ART)

FIG. 2b. Latest Start Time (PRIOR ART)

| Time | Ready list |
|---|---|
| 0 | Ld c (0), Ld d (0), Ld a (1), Ld b (1), Ld e (1), ld f (1) |
| 1 | Ld a (1), Ld b (1), Ld e (1), ld f (1), Mul (1) |
| 2 | Ld e (1), ld f (1), Mul (1), Add1 (2) |
| 3 | Mul (1), Add1 (2) |
| 4 | Sub1 (2), Add2 (3) |
| 5 | Sub2 (3) |
| 6 | Add3 (4) |

Schedule

| ALC0 | ALC1 | Regs |
|---|---|---|
| Ld c | Ld d | 2 |
| Mul | Ld a | 3 |
| Ld b | Ld e | 5 |
| Ld f | Add1 | 5 |
| Sub1 | Add2 | 3 |
| Sub2 | | 2 |
| Add3 | | 1 |

FIG. 3. Scheduling according to Latest Start Time (PRIOR ART)

FIG. 4. List Scheduling Algorithm

FIG. 5a. Dominating Predecessors

FIG. 5b. Register Economy priority

Fig. 6

REGISTER ECONOMY HEURISTIC FOR A CYCLE DRIVEN MULTIPLE ISSUE INSTRUCTION SCHEDULER

CROSS-REFERENCES TO RELATED APPLICATIONS

This application is a continuation of and claims the benefit of U.S. application Ser. No. 09/506,408, filed Feb. 17, 2000, now abandoned, which is a continuation of U.S. Applications Nos. 60/120,353, 60/120,357, 60/120,375, 60/120,448, 60/120,527 and 60/120,649, all filed Feb. 17, 1999, the disclosures of which are each incorporated herein by reference.

BACKGROUND OF THE INVENTION

The modem optimizing compiler for the Explicit Parallel Instruction Computing (EPIC) architecture performs the global task of detection and refining the potential parallelism of a source program being compiled. The EPIC architecture creates new possibilities for code optimization due to its ability to perform many operations in parallel.

Improvements in both programming techniques and hardware support to improve compiler optimization techniques are important to realizing the full potential of the EPIC architecture.

A Critical Path Algorithm can be utilized to schedule a basic block of operations. A critical path is defined as the longest path through a data dependency graph. A latest start time list is generated forming a number of time frames equal to the length of the critical path. Each operation is examined to determine whether it is dependent on another operation. For example, if an operation is not dependent on any other operation it can be scheduled last.

The EPIC approach is platform oriented and therefore code translation mechanisms are very important and include many platform dependent optimizations. Critical path algorithms facilitate the utilization of the full parallelism inherent in a target machine. However, the critical path strategy is not useful for scheduling when potential parallelism of a basic block being scheduled is much higher than the parallelism of the target hardware because the target hardware may have insufficient register resources required to hold data until dependencies and latencies are resolved.

One of the possible approaches to register allocation for processors with multiple functional units is described in U.S. Pat. No. 5,987,259 Patent titled "Functional unit switching for the allocation of registers". If some instruction is able to be performed onto a variety of possible functional units, it is scheduled at the unit with the least subscribed register resources. This method is useful for an architecture with separate register files connected to each functional unit. In case of two equivalent units and if there are insufficient registers associated with the first unit to keep all the temporary values necessary for some code region, instructions of that code region scheduled to perform on the first functional unit that may be executed on the second unit are detected. Those instructions are rescheduled for execution on the second functional unit. This method is not applicable for architectures with register files shared among a number of functional units.

Another approach to the problem of optimal register allocation is expounded in the paper "Combining Register Allocation and Instruction Scheduling" by Rajeev Motwani, Krishna V. Palem, Vivek Sarkar and Salem Reyen (Technical Report, Courant Institute, TR 698, July 1995). The main idea of that method is the formulation of combined register allocation and instruction scheduling within a basic block as a single optimization problem. An objective cost function that more directly captures the primary measure of interest in code optimization is the completion time of the last instruction. Unfortunately, a heuristic algorithm designed could not have been formulated in the context of an existing instruction scheduling/register allocation phase-ordered solution.

One more paper should be mentioned in context of the invention proposed: "Scheduling Expression DAGs for Minimal Register Need" by Christoph W. Kessler (University of Trier, Germany, faculty of Mathematics and Informatics, Monthly report 1996–12). This article presents a new algorithm for generating schedules for expression Data Dependency Graph (DAG) that uses a minimal number of registers. Classically it is a NP-complete problem, but the algorithm shows good results for expressions up to 50 operations. Extended to cope with multiple functional units this algorithm might be applied for EPIC architecture unless there is a requirement of minimal register usage. This may penalize performance due to restricted Instruction Level Parallelism (ILP).

Accordingly, improved techniques for scheduling operations in a basic block are required. The main requirements to be satisfied are: multiple functional units, shared register file, sensitivity to register pressure and operation latencies, compatibility with traditional phase-ordered compilation technique (separate operation scheduling and register allocation), unrestricted ILP.

SUMMARY OF THE INVENTION

Platform specific optimization methods for the EPIC architecture include full predication and speculation support. Optimizations based on the estimation of earliest and latest start times of operations and on a critical path strategy are applied to Extended Scalar Blocks (ESBs, also referred to as Basic Blocks). Extended Scalar Blocks are regions of the predicated code where all dependencies between operations are represented explicitly as a relation between two operations for a considerable number of operations. For each ESB the compiler works out the critical path which is defined as a sequence of operations that will take the longest CPU time and cannot be executed in parallel because of dependencies. The main goal of any optimizer in optimizing the compiler is to reduce the execution time of the program being optimized. Reduction of the critical path estimated in terms of target processor cycles is the application criterion applied to optimizations to achieve the main goal.

An optimizing compiler for an Explicit Parallel Instruction Computing (EPIC) architecture performs the global task of detecting and refining the potential parallelism of a source program being compiled.

According to one aspect of the invention, a heuristic for a List Scheduling algorithm schedules registers based on register economy which is helpful when scheduling scalar blocks of great potential parallelism. The critical path in this case is much longer than theoretical value. The register pressure is reduced at the scheduling phase.

According to another aspect of the invention, scheduling priority for a cycle-driven scalar scheduler is changed from operation of Latest Start Time to a function of two arguments: the number of successors of a particular operation and an order of operation in a tree-like IR (intermediate representation) structure.

According to another aspect of the invention, the use of new heuristic for well-known List Scheduling algorithm leads to smaller register pressure.

According to another aspect of the invention, an algorithm for calculation of register economy priority values (REP) includes the act of ordering operations of a basic block in a data dependency graph, indicating the number of predecessors for each ordered operation, and generating sequential REPs starting with the last operation in the ordered list.

Other features and advantages of the invention will be apparent in view of the following detailed description and appended drawings.

DETAILED DESCRIPTION OF THE SPECIFIC EMBODIMENTS

When implementing code translation strategies, a critical path strategy is not useful for scheduling when potential parallelism of the scalar block being scheduled is much higher than that of target hardware. According to a preferred embodiment of the invention, a specific register economy heuristic is applied to avoid redundant register pressure. The scheduling priority for a cycle-driven scalar scheduler is changed from operation Latest Start Time to some function of two arguments: the number of successors of a particular operation and the order of operations in a tree-like IR structure.

Figure 1:
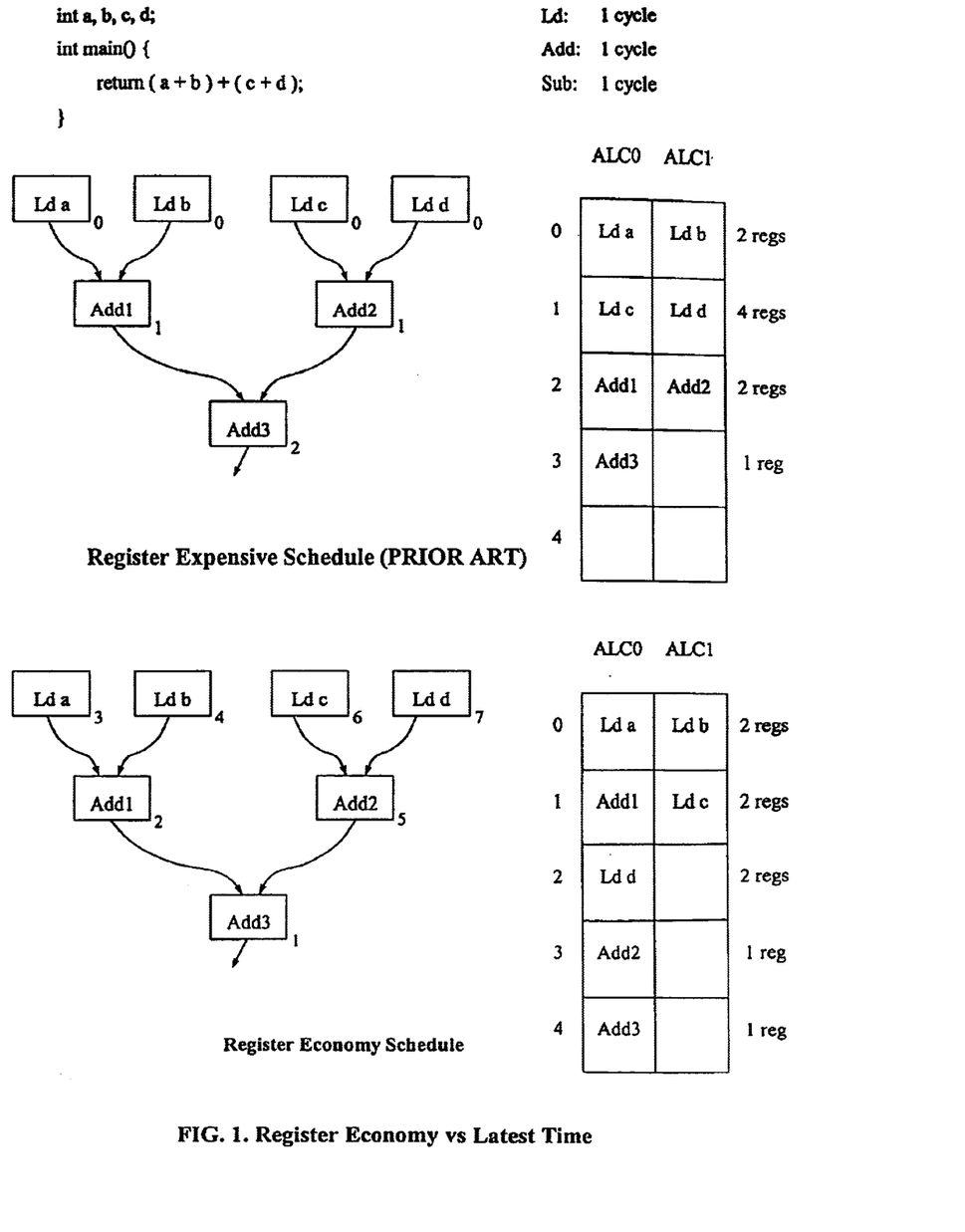
FIG. 1 is a diagram depicting the comparison of a prior art method of scheduling utilizing a Latest Start Time scheduling technique to a preferred embodiment of the scheduling technique.

A first example of the implementation of a preferred embodiment of the invention is depicted in FIG. 1 which depicts scheduling of the operations by an optimizing compiler to execute the expression (a+b)+(c+d) using the prior art Latest Start Time (LST) Priority Scheduling and a preferred embodiment of the Register Economy Priority (REP) scheduling. In FIG. 1 the LSTs are shown at the lower right of each operation in the LST Priority tree and the REP values are shown at the lower right of each operation in the tree-like IR.

The register expense schedule (resulting from LST priority scheduling) requires the four registers at time slot t=1. In contrast, the register economy schedule (resulting from REP priority scheduling) requires a maximum of only two registers at any time slot.

Thus, for a platform having a limited number of registers available REP scheduling will avoid consumption of limited register resources. As depicted in FIG. 1 the register economy scheduling requires more time slots to evaluate the expression. Accordingly, the selection of which scheduling technique to use will be platform driven.

The following is a detailed example of scheduling and priority calculation for the following short program in C language:

```
{
g = (a + b) + (c * d) + (d - (e - f)); // evaluate some expression
}
```

This program has two specific features. The first is that among integer operations like "add", "sub" there is a multiply. For this example, it is assumed that "add", "sub" typically take 1 clock cycle to perform and that "mul" takes 2 clock cycles so that there are different operation latencies.

The second feature is that variable "d" is used twice in the expression. This means that an optimizing compiler generates only one "Ld" for reading a value of variable "d" from memory and uses the resultant register as an operand both in "mul" and in "sub" operations.

Figure 2A:
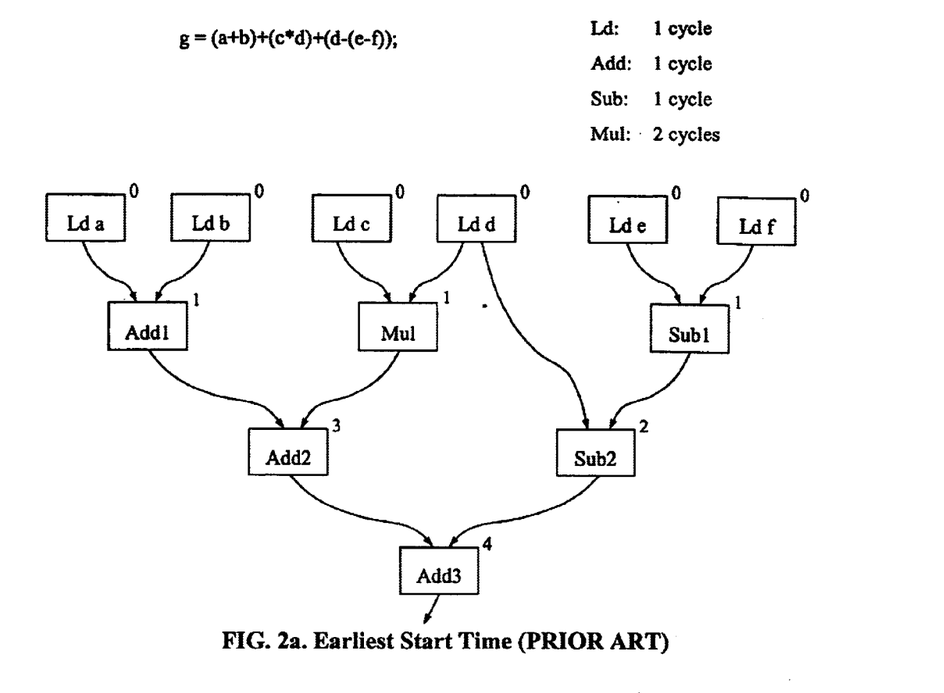
FIGS. 2A and 2B are DFGs illustrating the calculation of earliest and latest start times.
Figure 2B:
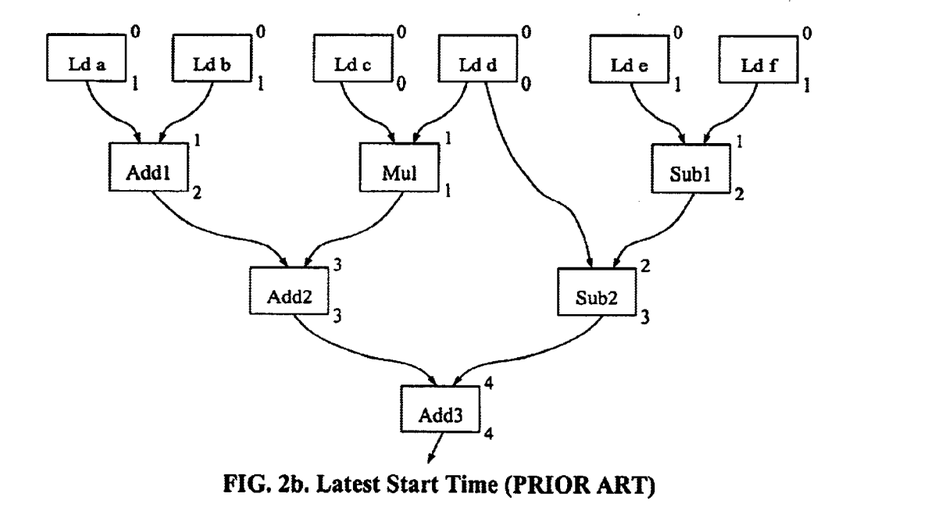

In this case, the Intermediate Representation (IR) of the expression in a compiler is not a balanced binary tree as it was in previous example, but a graph (FIGS. 2A and B). In the graph, operations are presented as nodes and dependencies between them as directed arcs in the form of a Data Flow Graph (DFG) which establishes a partial ordering on a set of operations of that expression. Partial ordering allows the expression of Instruction Level Parallelism (ILP) in the most convenient manner for operation scheduling. Any pair of operations which has no path between them is potentially parallel.

For a given DFG and given operation latencies the hypothetical time to execute this program on a processor with unlimited parallel resources (ALCs) and unlimited register space can be calculated. FIG. 2A illustrates the calculation of the Earliest Start Time (EST) and Latest Start Time (LST) for each operation.

At first the EST is calculated. For every operation having no predecessors the EST is assigned to zero (numbers near the top-right corner of each operation bar). Walking down through IR from each node to its successors an EST is assigned to every operation: EST(node)=max (EST(p1)+DEL(p1), ..., EST(pm)+DEL(pm)). Here p1, ..., pm are predecessors of the current operation, DEL(p1), ..., and DEL(pm) is a delay (latency) of predecessor operation, i.e. time consumed to obtain its result.

The next step is the calculation of the LST for each node as depicted in FIG. 2B. This calculation is done as follows. For last operation of the IR (add3) the LST is assigned the value of its EST. Walking up through the IR from each operation to its predecessors: LST(node)=min(LST(s1))−DEL(node), ..., LST(sn))−DEL(node)). Here s1, ... sn are successors of a current node. The LST is given in the figure near bottom-right corner of each operation bar.

The EST and LST of the last operation of the IR of the expression is a theoretically minimum time (Tmin) to perform calculations of that expression in a processor with a given delay of operations.

Operations having EST=LST are said to be critical, and are shaded in FIG. 2B, and other operations are noncritical. To keep the execution time equal to Tmin critical operations should be issued exactly at time slots corresponding to the EST=LST of that critical node. As to noncritical operations, each should be issued in some time slot between the EST and LST of that operation node. In general to keep the critical path close to Tmin the compiler (code generator)

must schedule each operation not later than its LST. That's why the LST is taken as a priority parameter in well-known list scheduling algorithm.

Figure 3:
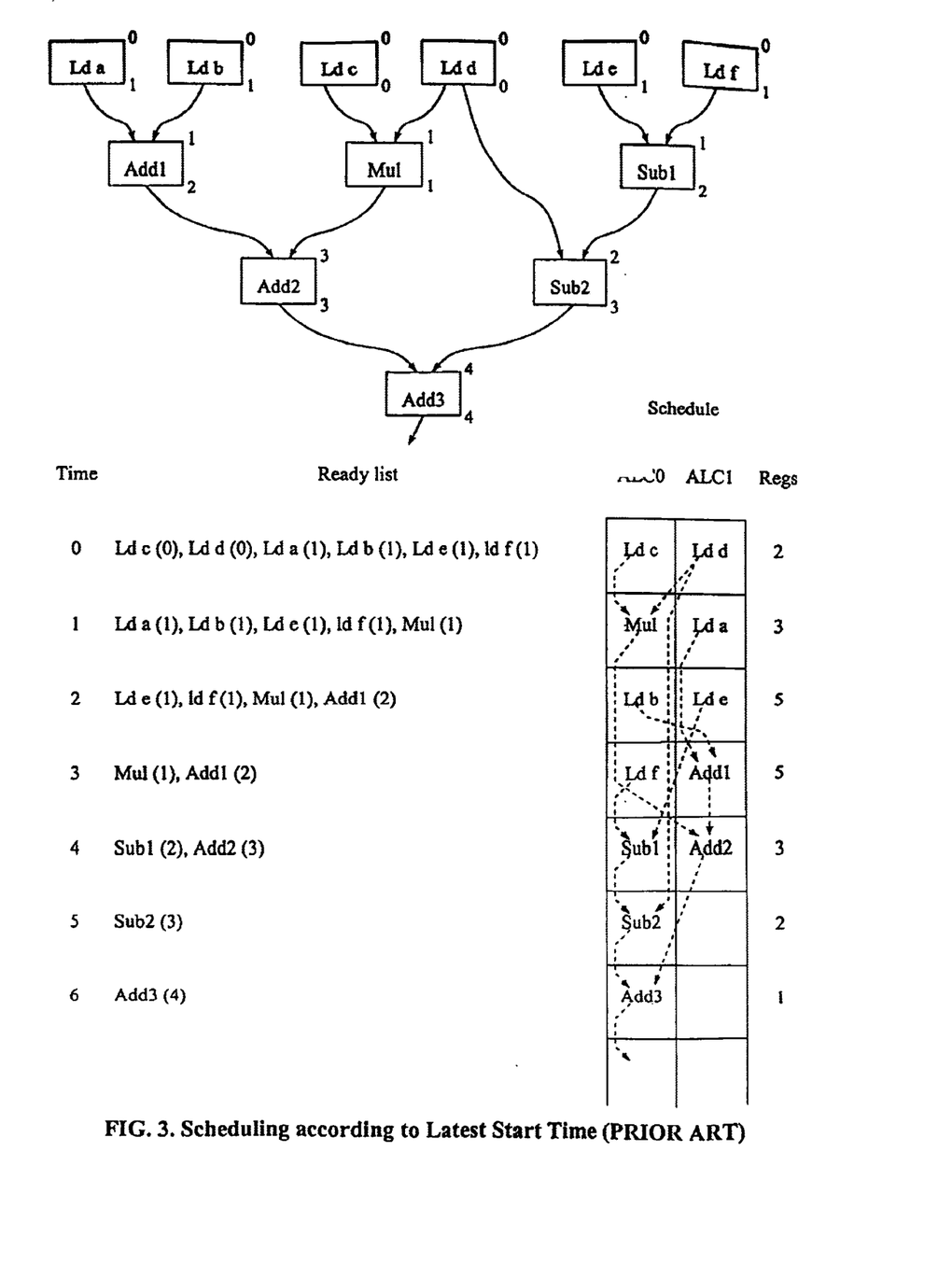
FIG. 3 is a diagram depicting an embodiment of scheduling technique utilizing a Latest Start Time scheduling method.

FIG. 3 is an example of the implementation of the Latest Start Time List Scheduling algorithm for a sample basic block being optimized. In FIG. 3 the earliest start time for each operation is indicated by an integer at the upper right-hand corner and the latest start time is indicated at the lower right-hand corner. The determination of earliest and latest start times is well-known in the art and is described in detail above.

FIG. 3 includes a tree-like IR structure in the form of a data dependency graph (DFG), a ready list having ready instructions listed in time slots for each level of the DFG, a table indicating which ready ops are scheduled during the time slot, and a list of the number of registers allocated to scheduled instructions. As is well-known in the art, registers are released to the pool when the last use of the result of the scheduled instruction is resolved.

The rightmost column in FIG. 3 shows how many registers are used (register pressure) in every time slot of the schedule (Table). Time is depicted at a leftmost column. Dashed arrows between operations in the schedule illustrate real result-operand value passing. Register pressure is a number of arrows crossing each boundary between adjacent time slots. Particularly for FIG. 3 two arrows from "Ld a", "Ld d" scheduled in time 0 cross the time boundary 0–1 (Regs=2), three arrows from "Ld d", "mul", "Ld a" cross 1–2 time boundary (Regs=3), and so on.

Columns in the table marked ALC0 and ALC1 indicate two arithmetic channels of a hypothetical processor. For every clock cycle one operation of any kind (Ld, add, sub, etc.) may be issued to either ALC0 or ALC1. This is an illustration of hardware abilities similar for LST priority scheduling and REP scheduling.

Figure 4:
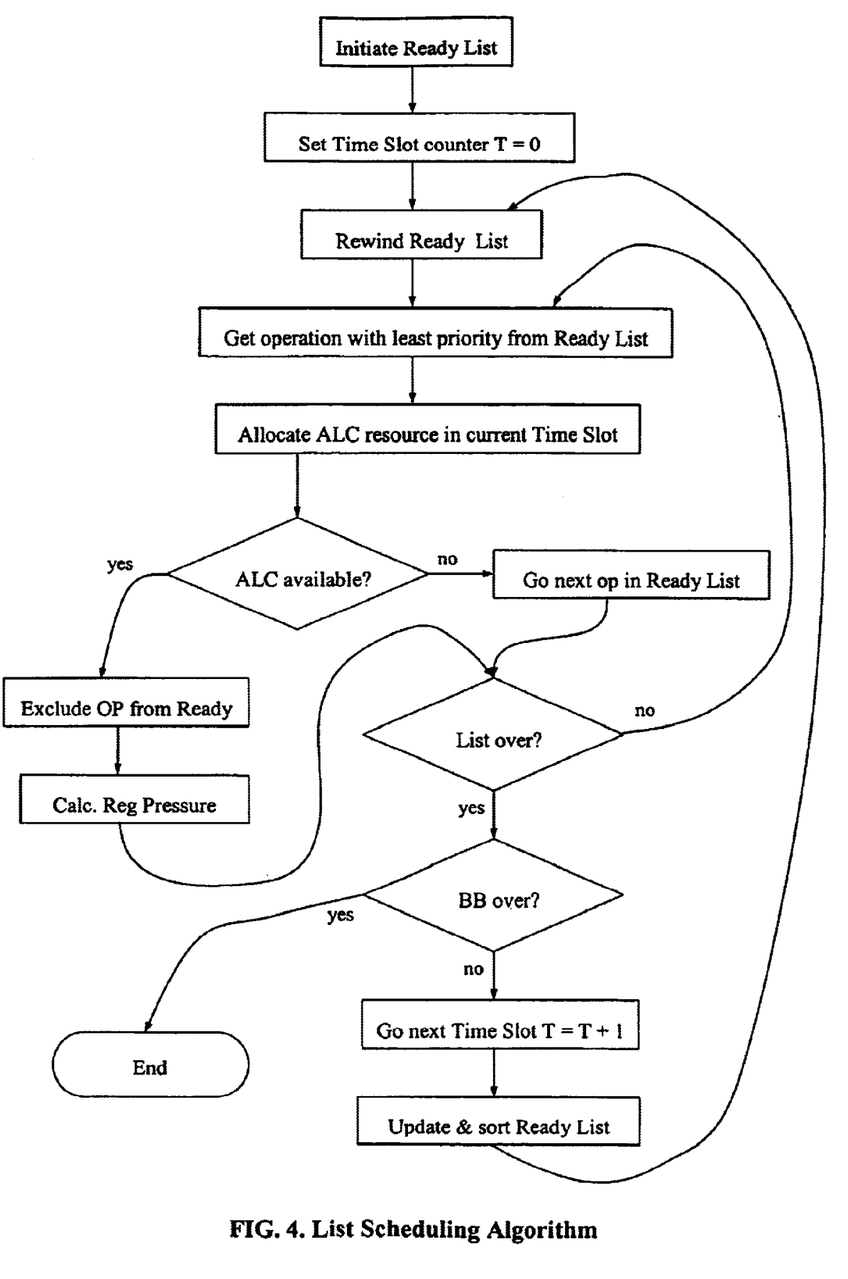
FIG. 4 is a flow chart depicting the List Scheduling Algorithm.

The Ready List is generated and modified during operation of the List Scheduling algorithm as depicted in the flow chart of FIG. 4. This algorithm is a time-driven way of placing operations into available operation slots of program code. The List scheduler takes into account properties of the Arithmetic-Logic Channels (ALCs) (how many channels are there, operation repertoire and latencies) and builds a timetable (tables in FIGS. 1 and 2) listing what operation is decoded every clock cycle and at which ALC. This process is performed for every Basic Block of the program being compiled.

FIG. 3 illustrates scheduling of an example Basic Block using the Latest Start Time scheduling algorithm. At first the Ready list is initiated by operations having no predecessors (in this case Loads). The Ready List is ordered by some value, in FIG. 3 the latest start time, attributed for every operation which is given in parentheses at the right of the operation. At every time slot T the Ready List contains a set of operations which are ready to issue at this time T. This means that all the predecessors of the ready operation have been scheduled before and are finished (latency is over). Beginning from the head of the list ready operations are selected and ALC resources are allocated within current time slot T.

The List Scheduling Algorithm implements a time-driven way of operation scheduling. Evolution of the IR scheduling is depicted in FIG. 3. At every current clock cycle beginning from 0 a set of ready operations is constructed (list of ready). The list is ordered in accordance with some priority which is shown in braces next to the operation in the list. Operations with smaller priority are located at the beginning of the list and will be selected to schedule first.

In classical list scheduling algorithm this priority is equal to the LST. Once the ready list is established, the scheduler simply gets the first operation from the list and tries to allocate a free Arithmetic Logic Channel (ALC0 or ALC1) for it. If the operation is successfully scheduled, it's removed from the ready list. When all possible operations are scheduled at a current clock cycle, the algorithm goes to the next cycle. The ordered ready list is updated with regard to previously scheduled operations and their latencies. The process iterates until the ready list becomes empty. The resultant schedule takes 7 clock cycles and 5 registers to execute.

For instance, in FIG. 3 at a time T=0 six operations are ready (Ld c, Ld d, Ld a, Ld b, Ld e, Ld f), but only two of them are scheduled: "Ld c"→ALC0 "Ld d"→ALC1. After scheduling, time is advanced to the next slot and the Ready List is updated for the next slot in accordance with results of scheduling. Successors of an operation scheduled in time T (or earlier) may become ready in time T+1. For instance (FIG. 3) in time T=1 operation "mul" becomes ready since both predecessors are scheduled at a time T=0 and have latencies=1. The process iterates until all operations of the Basic Block (BB) are scheduled.

In FIG. 3, "Ld c" and "Ld d" have the lowest values of the latest starting time. These operations must be completed before "mul", "add2", "sub2", and "add3". Accordingly, "Ld d" is scheduled in time slot 0. Note that "Ld d" supplies data to "mul" and "sub2" as indicated by the dashed arrows in the chart. However, "sub2" is not scheduled by the latest start time listing algorithm until time slot 5. Accordingly, a register must be allocated for "Ld d" during time slots 0–5. As indicated by Regs column, this causes an extra register to be allocated at each time slot and increases register pressure.

A preferred embodiment of the register economy heuristic relies upon the same scheduling algorithm, but a different priority (not an LST) for each operation. The new priority is calculated as shown in FIGS. 5A and B in two steps.

Figure 5A:
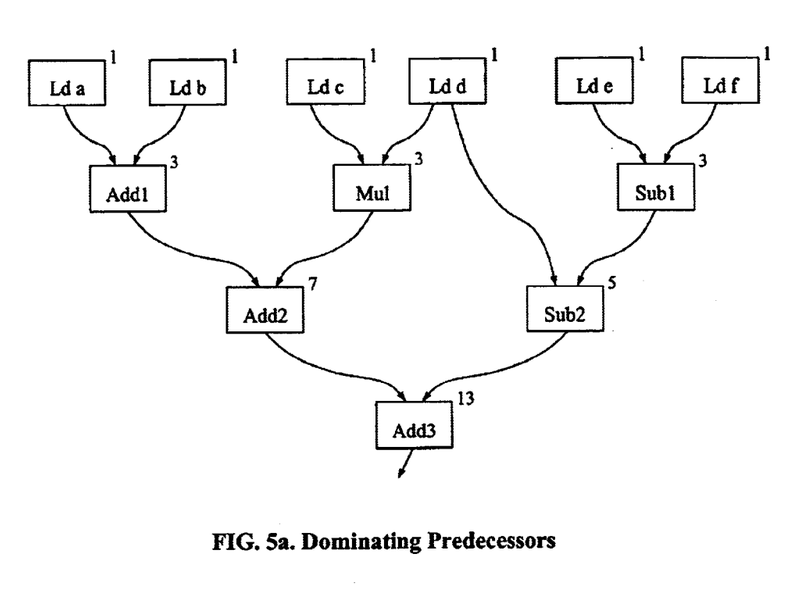
FIGS. 5A and 5B are DFGs illustrating the calculation of the number of dominating predecessors (NDPs) and Register Priority (REP) values.
Figure 5B:
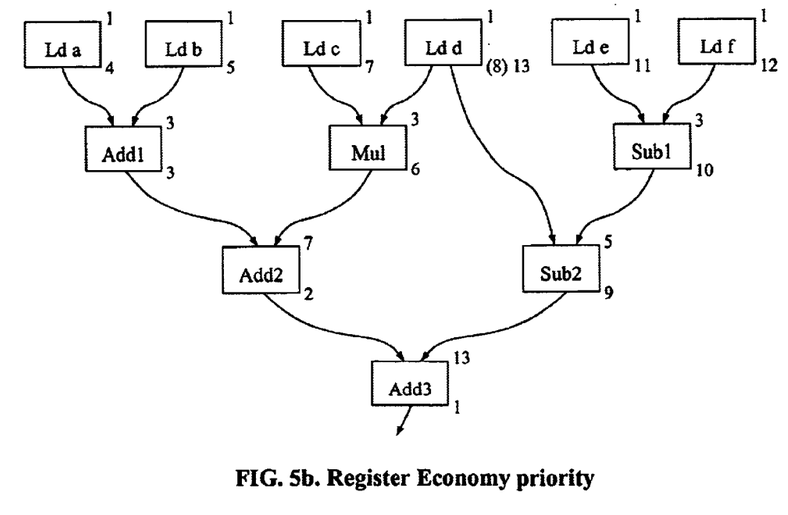

At first, as depicted in FIG. 5A, for each node a number of dominating predecessors (NDPs) is calculated, including node itself: NDP=1+NDP(p1)+ . . . +NDP(pm). Here p1, . . . , pm are again predecessors. For nodes without predecessors NDP=1. This NDP value is calculated walking down through IR from each node to its successors. Values of NDP are given near top-right corner of each operation bar.

Secondly, as depicted in FIG. 5B, a new Register Economy Priority (REP) is calculated for each operation. For last operation of the IR (add3) this value REP is assigned to 1. Also this value is assigned to a temporary counter CNT. Walking up through IR from each operation to its predecessors a temporary counter is incremented and assigned an REP(node)=CNT. For two or more predecessors the first predecessor having the greatest NDP is visited first.

The REP value is given in the down side of FIG. 5B near the bottom-right corner of each operation bar. Note that operation "Ld d" is visited twice: once by path d3"–"sub2"–"Ld d" (and assigned a REP=8) and again by path "add3"–"add2"–"mul"–"Ld d" (and assigned a final REP=13). Actually, the value REP=8 is not assigned to "Ld d" since it wasn't the last visit to it from the remaining successor.

Figure 6:
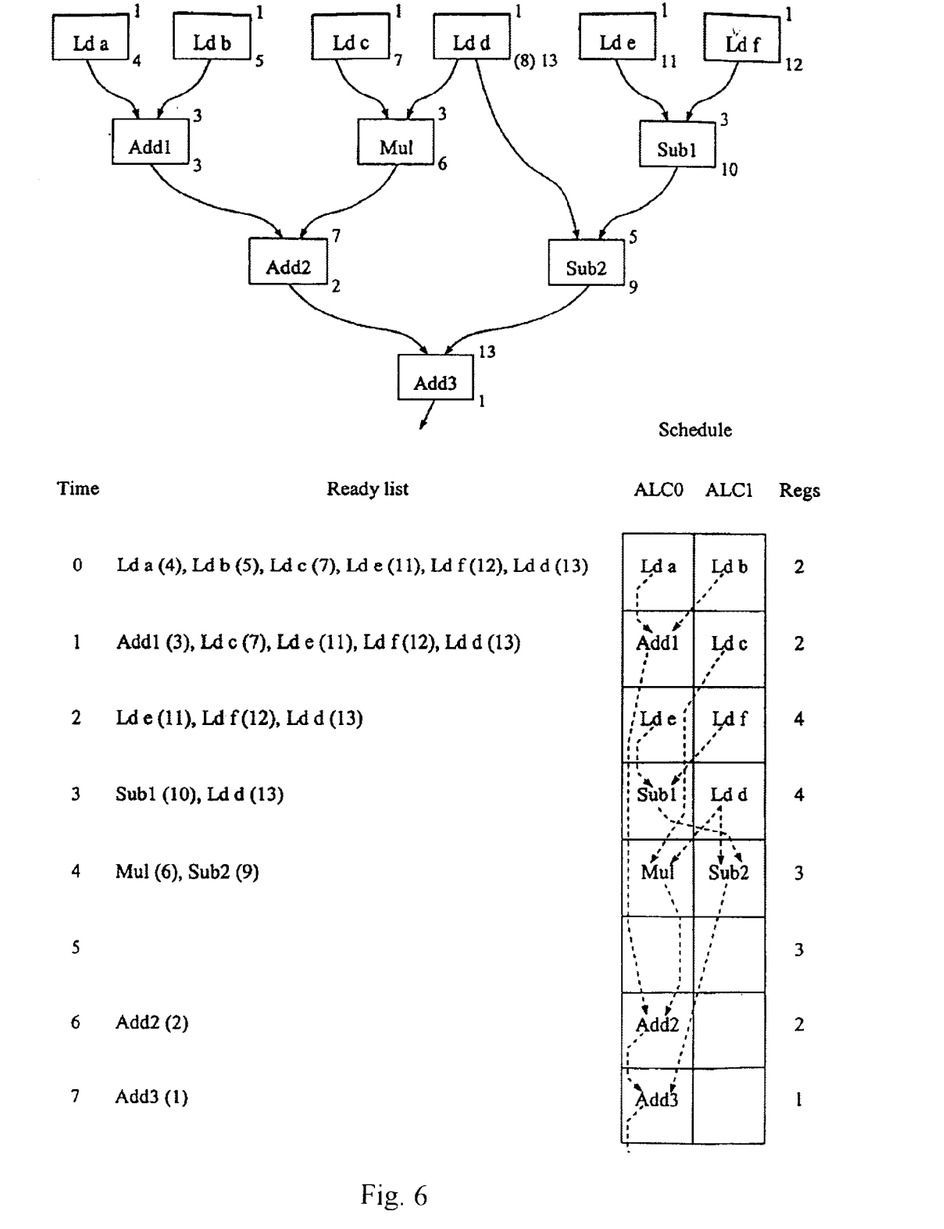
FIG. 6 is a diagram depicting an embodiment of scheduling technique utilizing a register economy priority scheduling method.

FIG. 6 depicts a preferred embodiment of the invention which schedules a basic block according to a register economy priority list scheduling algorithm. Similar to the description of FIG. 3, at every time slot T the Ready List contains a set of operations which are ready to issue at this time T. This means that all the predecessors of the ready operation have been scheduled before and are finished (latency is over). However, in this case the priority of ready operations is determined by Register Economy Priority (REP) values, which are indicated at the lower right of each block. An NDP (number of predecessors) parameter is indicated at the upper right of each block.

In FIG. 6, for time slot 0 all the load operations are listed in order of REP values (shown in parentheses after each operation in the ready list). These values indicate whether the operation must be held in a register for several time slots and are calculated according to an algorithm described above. "Ld a" and "Ld b" have the lowest REPs because these registers may be freed as soon as "add1" completes. "Ld d" has the highest REP because it cannot be cleared until "sub2" completes which in turn cannot be completed until "sub1" competes. Accordingly, "Ld d" is not scheduled until time slot 3, thereby reducing the register pressure in the previous time slots.

For the example basic block (the same block depicted in FIGS. 2A and B ) the register pressure is reduced using the register economy priority listing algorithm. In this particular example, the reduced pressure is due to scheduling "Ld d" and "mul" later than in the example of FIGS. 2A and B. Thus, a register does not need to be allocated for "Ld d" during time slots 0–2 and fewer registers are required. On the other hand the overall execution time of the basic block has been increased due to the latency introduced by the "mul" operation.

At time slot 0 all the loads are ready and "Ld a" and "Ld b" are scheduled in ALC0 and ALC1 because they have the lowest REPs. At time slot 1 the dependency of "add1" has been removed so that "add1" and "Ld c" have the lowest REPs and are scheduled next.

A preferred embodiment of an Algorithm of REP value calculation is listed as two following recursive routines:

```
subroutine CalcNDP( operation cur_op )
{
    operation cur_succ;
    if( number_of_redecessors( cur_op ) == 0) {
        NDP( cur_op ) = 1;
    }
    else {
        NDP( cur_op ) = NDP( pred1 ) +...+ NDP( predn ) + 1;
    }
    endif
    for( cur_succ in successors( cur_op )) {
        CalcNDP( cur_succ );
    }
}
integer cur_rep;
subroutine CalCREP( operation cur_op )
{
    operation cur_pred;
    NDP( cur_op) = cur_rep;
    cur_rep = cur_rep + 1;
    for( cur_pred in preds( cur_op )
         from pred with max NDP
         to pred with min NDP) {
        CalcREP( cur_pred );
    }
}
```

In the "for" loop some temporary variable 'cur_pred' is declared to keep the current predecessor of current operation 'cur_op'. Predecessors are assigned to 'cur_pred' in order from the predecessor with the max NDP value (calculated previously in CalcNDP routine) to the predecessor with the min NDP value. If predecessors have equivalent values of NDP they are selected "from left to right" in the picture. When the current predecessor is assigned, the loop body is performed. It contains only the recursive invocation of CalcREP routine with a parameter 'cur_pred' assigned.

These two routines must be invoked once to calculate the NDP attribute for each operation of the BB in the following manner:

CalcNDP(first_op_of_BB);

$cur_{13}$ ndp=1;

CalcREP(last_op_of_BB);

So the real NDP(Ld d)=13, not 8 since the second visit to this operation overwrites previously calculated value.

A sequence of CalcREP invocations and FOR loop iterations for IR in FIGS. 4, 5 is given below.

```
Note two visits to "'Ld d'".
cur_ndp = 1
call CalcREP_1( add3 )
    REP( add3 ) = 1
    cur_rep = 2
    for_1( cur_pred_1 in (add2(7), sub2(5)))
        call CalcREP_2( add2 )
            REP( add3 ) = 2
            cur_rep = 3
            for_2( cur_pred_2 in (add1(3), mul(3)))
                call CalcREP_3( add1 )
                    REP( add1 ) = 3
                    cur_rep = 4
                    for_3( cur_pred_3 in (Ld a(1), Ld b(1)))
                        call CalcREP_4( Ld a )
                            REP( Ld a ) = 4
                            cur_rep = 5
                        exit CalcREP_4
                        call CalcREP_5( Ld b )
                            REP( Ld b ) = 5
                            cur_rep = 6
                        exit CalcREP_5
                    exit for_3
                exit CalcREP_3
                call CalcREP_6( mul )
                    REP( mul ) = 6
                    cur_rep = 7
                    for_4( cur_pred_4 in (Ld c(1), Ld d(1)))
                        call CalcREP_7( Ld c )
                            REP( Ld c ) = 7
                            cur_rep = 8
                        exit CalcREP_7
                        call CalcREP_8( Ld d ) // first visit to Ld d
                            REP( Ld c ) = 8
                            cur_rep = 9
                        exit CalcREP_8
                    exit for_4
                exit CalcREP_6
            exit for_2
        exit CalcREP_2
        call CalcREP_9( sub2 )
            REP( sub2 ) = 9
            cur_rep = 10
            for_5( cur_pred_5 in (sub1(13), Ld d(1)))
                call CalcREP_11( sub1 )
                    REP( sub1 ) = 11
                    cur_rep = 12
                    for_6( cur_pred_6 in (Ld e(1), Ld f(1)))
                        call CalcREP_12( Ld e )
                            REP( Ld e ) = 12
                            cur_rep = 13
                        exit CalcREP_12
                        call CalcREP_13( Ld f )
                            REP( Ld f ) = 13
                            cur_rep = 14
                        exit CalcREP_13
                    exit for_6
                exit CalcREP_11
                call CalcREP_13( Ld d ) // Second visit to Ld d
                    REP( Ld d ) = 13
```

-continued

```
            cur_rep = 14
          exit CalcREP_13
        exit for_5
      exit CalcREP_9
    exit for_1
  exit CalcREP_1.
```

In a preferred embodiment the invention may be implemented by software stored as program code on a computer readable media which may include magnetic storage media, optical storage media, signals modulated on electromagnetic waves, or other types of media. The program code is read from the media and executed by a digital processor.

The invention has now been defined for the preferred embodiments. Alternatives and substitutions will now be apparent to persons of ordinary skill in the art. For example, different REP values can be assigned as long as the operations are ordered to reduce register pressure. Accordingly, it is not intended to limit the invention except as provided by the appended claims.

What is claimed is:

1. A method for scheduling operations in a basic block comprising the acts of:
   ordering operations in the block into a data dependency graph (DFG) showing predecessors and successors of each operation;
   scheduling time slots for each level of the DFG;
   assigning a number of predecessors value to each operation node in the DFG indicating the number of predecessors that an operation depends on;
   setting a counter value equal to a first value;
   assigning the first value to a last operation node having the greatest number of predecessors;
   for each operation in the DFG preceding the last operation node, incrementing the counter to obtain an incremented counter value, and, for binary nodes having multiple predecessors, assigning the incremented counter value as an economy priority value to the immediate predecessor having a higher number of dominating predecessors;
   subsequent to assigning a counter value to an operation having a maximum number of dominating predecessors, returning to the binary operation node and assigning the incremented counter value as an economy priority value to the immediate predecessor having the next highest number of dominating predecessors;
   for a first time slot, listing all ready operations having no unresolved dependencies which may be scheduled to execute in a fixed number of arithmetic/logic channels (ALCs);
   scheduling the fixed number of ready operations in the first time slot having the lowest economy priority values;
   for the second time slot listing all unscheduled ready operations having no unresolved dependencies which may be scheduled to execute in the fixed number of ALCs;
   scheduling the fixed number of ready operations in the second time slot having the lowest economy priority values;
   for all subsequent time slots, listing all unscheduled ready operations having no unresolved dependencies which may be scheduled to execute in the fixed number of ALCs until all operations in the block are scheduled; and
   scheduling the fixed number of ready operations in the subsequent time slots having the lowest economy priority values.

2. A method for scheduling operations in a basic block comprising the acts of:
   ordering operations in the block into a data dependency graph (DFG);
   scheduling time slots for each level of the DFG;
   for each node, calculating a number of dominating predecessors (NDPs), including node itself: NDP=1+NDP(p1)+ ... +NDP(pm) where p1, ..., pm are immediate predecessors to the node and where for nodes without predecessors NDP=1;
   for last operation of the DFG having a greatest value of NDP, assigning a minimum value of a register priority (REP) value;
   assigning the minimum REP value to a temporary counter CNT;
   walking up through DFG from each operation to its predecessors, incrementing CNT, and assigning an REP(node)=CNT;
   for two or more immediate predecessors the first immediate predecessor having the greatest NDP is visited first;
   for a first time slot, listing all ready operations having no unresolved dependencies which may be scheduled to execute in a fixed number of arithmetic/logic channels (ALCs);
   scheduling the fixed number of ready operations in the first time slot having the lowest REP values;
   for the second time slot listing all unscheduled ready operations having no unresolved dependencies which may be scheduled to execute in the fixed number of ALCs;
   scheduling the fixed number of ready operations in the second time slot having the lowest REP values;
   for all subsequent time slots, listing all unscheduled ready operations having no unresolved dependencies which may be scheduled to execute in the fixed number of ALCs until all operations in the block are scheduled; and
   scheduling the fixed number of ready operations in the subsequent time slots having the lowest REP values.

3. A method, implemented by an optimizing compiler, for scheduling a group of operations, said method comprising the steps of:
   ordering the operations based on data dependencies;
   assigning a number of predecessors value to ordered operations based on the number of predecessors on which the ordered operation depends;
   assigning an economy priority value to each operation, starting with the operation having the most predecessors, by traversing the ordered list in order of number of predecessors values and incrementing the economy priority value assigned to each operation;
   forming a ready list having a plurality of time slots with ready operations scheduled in each time slot ordered by economy priority values; and
   scheduling operations in each time slot in order of economy priority to a fixed number of arithmetic-logic resources.

4. The method of claim 3 further comprising the steps of:

for binary operations having more than one predecessor, traversing to the predecessor having the largest number of predecessor values; and for operations having no predecessor, resuming traversing at the binary operation and traversing to the immediate predecessor not previously traversed.

5. The method of claim 3 further comprising the step of:

for binary operations having more than one immediate predecessor, each predecessor having the same number of dominating predecessors value, traversing to first one of the immediate predecessors.

6. A computer program product comprising:

a computer readable medium having program code embodied therein for implementing compiler techniques for scheduling a group of operations, said program code comprising:

program code executable by a computer for ordering the operations based on data dependencies;

program code executable by a computer for assigning a number of predecessors value to ordered operations based on the number of predecessors on which the ordered operation depends;

program code executable by a computer for assigning an economy priority value to each operation, starting with the operation having the most predecessors, by traversing the ordered list in order of number of predecessors values and incrementing the economy priority value assigned to each operation;

program code executable by a computer for forming a ready list having a plurality of time slots with ready operations scheduled in each time slot ordered by economy priority values; and program code executable by a computer for scheduling operations in each time slot in order of economy priority to a fixed number of arithmetic-logic resources.

\* \* \* \* \*